United States Patent
Yamamoto

(10) Patent No.: US 11,378,873 B2
(45) Date of Patent: Jul. 5, 2022

(54) PROJECTION DISPLAY DEVICE

(71) Applicant: FUJIFILM Corporation, Tokyo (JP)

(72) Inventor: Chikara Yamamoto, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/185,389

(22) Filed: Feb. 25, 2021

(65) Prior Publication Data

US 2021/0181613 A1 Jun. 17, 2021

Related U.S. Application Data

(63) Continuation of application No. PCT/JP2019/032461, filed on Aug. 20, 2019.

(30) Foreign Application Priority Data

Aug. 31, 2018 (JP) .............................. JP2018-163999

(51) Int. Cl.
  *G03B 21/14* (2006.01)
  *G03B 21/28* (2006.01)
  *H04N 9/31* (2006.01)

(52) U.S. Cl.
  CPC ........... *G03B 21/147* (2013.01); *G03B 21/28* (2013.01); *H04N 9/312* (2013.01); *H04N 9/315* (2013.01); *H04N 9/3197* (2013.01)

(58) Field of Classification Search
  CPC ...... G03B 21/147; G03B 21/28; H04N 9/312; H04N 9/315; H04N 9/3197; H04N 9/317; H04N 9/3185; H04N 9/3194
  See application file for complete search history.

(56) References Cited

U.S. PATENT DOCUMENTS 11,119,393 B2* 9/2021 Amano .................. G03B 21/30
11,126,075 B2* 9/2021 Su ....................... G03B 21/2066
(Continued)

FOREIGN PATENT DOCUMENTS

JP 4-270375 A 9/1992
JP 10-85472 A 4/1998
(Continued)

OTHER PUBLICATIONS

International Preliminary Report on Patentability (Forms PCT/IPEA/409 and PCT/IPEA/416) for International Application No. PCT/JP2019/032461, dated Nov. 13, 2020, with English translation.
(Continued)

*Primary Examiner* — Paulos M Natnael
(74) *Attorney, Agent, or Firm* — Birch, Stewart, Kolasch & Birch, LLP

(57) ABSTRACT

A projection display device of a front projection type includes a light valve that modulates light based on image data and emits the light and an image forming optical system that projects an optical image of the light modulated by the light valve onto a projection surface, in which the image forming optical system includes a first optical system that includes at least one lens and a first reflection member that reflects the light emitted from the light valve toward the first optical system, the first optical system and the first reflection member are configured to be rotatable in a pitch direction, and the first reflection member rotates by a pitch angle $\theta/2$ in conjunction with rotation of the first optical system by a pitch angle $\theta$.

20 Claims, 12 Drawing Sheets

(56) References Cited

U.S. PATENT DOCUMENTS

| | | | |
|---|---|---|---|
| 2007/0002284 A1 | 1/2007 | Imaoka et al. | |
| 2014/0307064 A1* | 10/2014 | Horimai | H04N 13/393 |
| | | | 348/51 |
| 2018/0217489 A1 | 8/2018 | Kuroda | |
| 2019/0086783 A1 | 3/2019 | Kuroda | |
| 2019/0101816 A1 | 4/2019 | Kuroda | |
| 2021/0124251 A1* | 4/2021 | Shimizu | G02B 26/08 |

FOREIGN PATENT DOCUMENTS

| | | |
|---|---|---|
| JP | 2004-170543 A | 6/2004 |
| JP | 2004-347689 A | 12/2004 |
| JP | 2007-41529 A | 2/2007 |
| JP | 2007-86274 A | 4/2007 |
| JP | 2009-69789 A | 4/2009 |
| JP | 2014-98807 A | 5/2014 |
| JP | 3192199 U | 7/2014 |
| JP | 2017-9665 A | 1/2017 |
| WO | WO 2017/056925 A1 | 4/2017 |

OTHER PUBLICATIONS

International Search Report (Form PCT/ISA/210) for International Application No. PCT/JP2019/032461, dated Nov. 19, 2019, with English translation.
Written Opinion of the International Searching Authority (Form PCT/ISA/237) for International Application No. PCT/JP2019/032461, dated Nov. 19, 2019, with English translation.
Japanese Office Action for corresponding Japanese Application No. 2020-539370, dated Jan. 25, 2022, with English translation.

* cited by examiner

PROJECTION DISPLAY DEVICE

CROSS-REFERENCE TO RELATED APPLICATIONS

This application is a continuation application of International Application No. PCT/JP2019/032461, filed Aug. 20, 2019, the disclosure of which is incorporated herein by reference in its entirety. Further, this application claims priority from Japanese Patent Application No. 2018-163999, filed Aug. 31, 2018, the disclosure of which is incorporated herein by reference in its entirety.

BACKGROUND OF THE INVENTION

1. Field of the Invention

The present disclosure relates to a projection display device.

2. Description of the Related Art

In recent years, a projection display device of a front projection type that comprises a light valve, such as a liquid crystal display element or a digital micromirror device (DMD: registered trademark) display element, has been suggested (for example, JP2004-170543A).

SUMMARY OF THE INVENTION

In the projection display device of a front projection type, in a case where an installation position of the device and/or a projection angle of projection light is not appropriate with respect to a screen, a shape of a projected image is deformed, which causes a problem of so-called trapezoidal distortion.

In the projection display device disclosed in JP2004-170543A, a shape of a projection image is deformed by two-dimensional image processing based on image data obtained by capturing an image projected on a screen to correct trapezoidal distortion of the projected image.

However, in a case where trapezoidal distortion is corrected by the two-dimensional image processing, so-called dot-by-dot display in which pixels in the image data and pixels in a display element are made to correspond to each other in a one-to-one manner cannot be performed, and therefore, a problem such as decrease in sharpness of the projected image occurs. For this reason, a projection display device capable of optically correcting trapezoidal distortion is desired.

In view of the above circumstances, an object of the present disclosure is to provide a projection display device capable of optically correcting trapezoidal distortion.

Specific means for solving the above problem includes the following aspects.

<1> A projection display device of a front projection type comprising: a light valve that modulates light based on image data and emits the light; and an image forming optical system that projects an optical image of the light modulated by the light valve onto a projection surface, in which the image forming optical system includes a first optical system that includes at least one lens and a first reflection member that reflects the light emitted from the light valve toward the first optical system, the first optical system and the first reflection member are configured to be rotatable in a pitch direction, and the first reflection member rotates by a pitch angle θ/2 in conjunction with rotation of the first optical system by a pitch angle θ.

<2> The projection display device according to <1>, in which the image forming optical system includes a second reflection member that reflects the light emitted from the light valve.

<3> The projection display device according to <1> or <2>, in which the image forming optical system is a relay optical system that forms an intermediate image.

<4> The projection display device according to any one of <1> to <3>, in which a total angle of view of the image forming optical system is 90 or more.

<5> The projection display device according to any one of <1> to <4>, further comprising: a first driving unit that rotatably drives the first optical system and the first reflection member in the pitch direction.

<6> The projection display device according to <5>, further comprising: a first control unit that controls an amount of rotation driving of the first optical system and the first reflection member in the pitch direction by the first driving unit based on a shape of the optical image projected on the projection surface.

<7> The projection display device according to any one <1> to <6>, in which the reflection member closest to the projection surface side along an optical path and at least a portion of the first optical system on a magnification side from the reflection member closest to the projection surface side are configured to be integrally rotatable in a yaw direction around an optical axis on the light valve side with the reflection member closest to the projection surface side as abase point.

<8> The projection display device according to <7>, further comprising: a second driving unit that rotatably drives the reflection member closest to the projection surface side along the optical path and at least the portion of the first optical system on the magnification side from the reflection member closest to the projection surface side in the yaw direction.

<9> The projection display device according to <8>, further comprising: a second control unit that controls, based on a shape of the optical image projected on the projection surface, an amount of rotation driving of the reflection member closest to the projection surface side along the optical path and at least the portion of the first optical system on the magnification side from the reflection member closest to the projection surface side in the yaw direction by the second driving unit.

<10> A projection display device of a front projection type comprising: a light valve that modulates light based on image data and emits the light; and an image forming optical system that projects an optical image of the light modulated by the light valve onto a projection surface, in which the image forming optical system includes a first optical system that includes at least one lens and at least one reflection member that reflects the light emitted from the light valve, the reflection member closest to the projection surface side along an optical path and at least a portion of the first optical system on a magnification side from the reflection member closest to the projection surface side are configured to be integrally rotatable in a yaw direction around an optical axis on the light valve side with the reflection member closest to the projection surface side as a base point, and the projection display device includes a second driving unit that rotatably drives the reflection member closest to the projection surface side along the optical path and at least the portion of the first optical system on the magnification side from the reflection member closest to the projection surface side in the yaw direction.

<11> The projection display device according to <10>, further comprising: a second control unit that controls, based on a shape of the optical image projected on the projection surface, an amount of rotation driving of the reflection member closest to the projection surface side along the optical path and at least the portion of the first optical system on the magnification side from the reflection member closest to the projection surface side in the yaw direction by the second driving unit.

<12> The projection display device according to <10> or <11>, in which the image forming optical system is a relay optical system that forms an intermediate image.

<13> The projection display device according to any one of <10> to <12>, in which a total angle of view of the image forming optical system is 90 or more.

According to the present disclosure, it is possible to provide a projection display device capable of optically correcting trapezoidal distortion.

DESCRIPTION OF THE PREFERRED EMBODIMENTS

Figure 1:
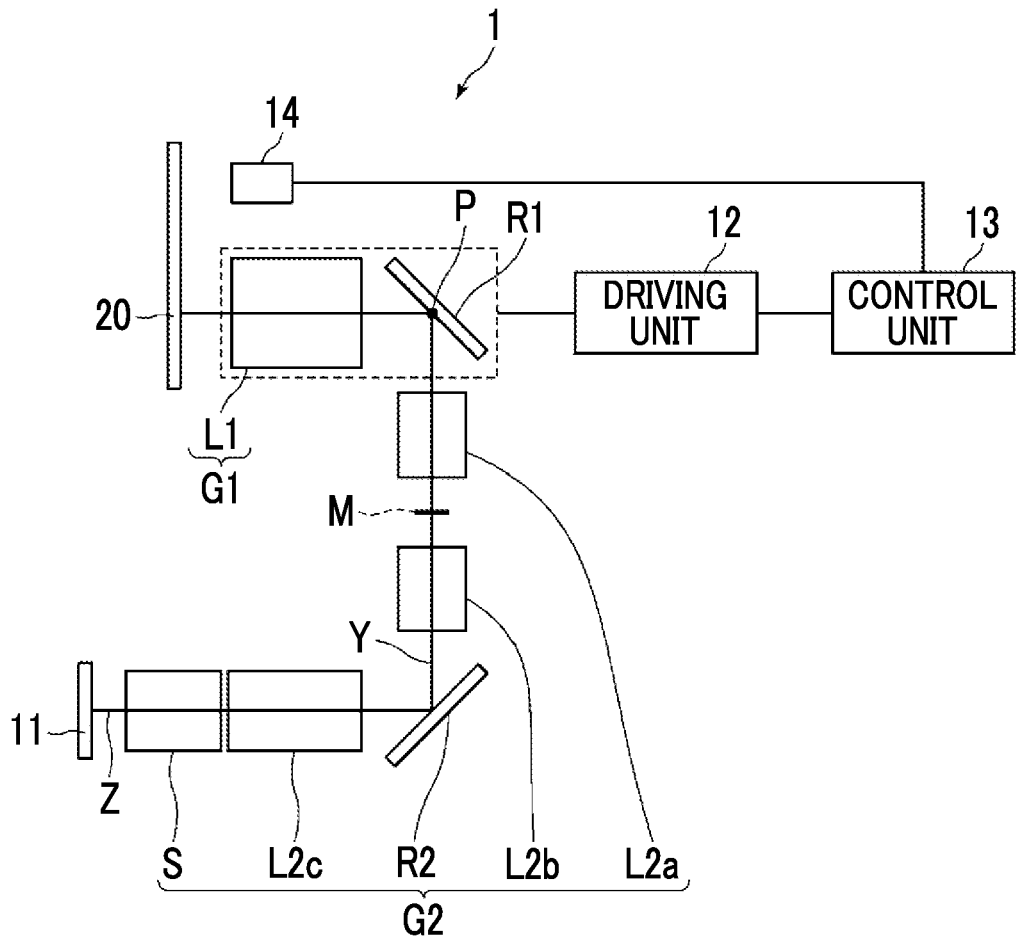
FIG. 1 is a schematic configuration diagram of a projection display device according to a first embodiment of the present invention.
Figure 2:
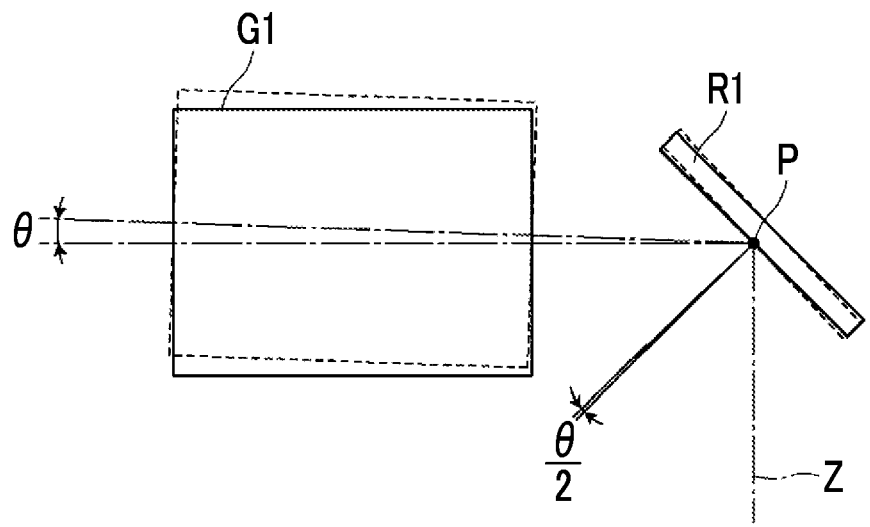
FIG. 2 is a schematic configuration diagram of a first optical system and a first reflection member in the projection display device shown in FIG. 1.

Hereinafter, a first embodiment of a projection display device of the present invention will be described in detail with reference to the drawings. FIG. 1 is a schematic configuration diagram of a projection display device according to the first embodiment of the present invention, and FIG. 2 is a schematic configuration diagram of a first optical system and a first reflection member in the projection display device. In FIG. 1, a screen 20 side is shown to be a magnification side in an optical path order.

As shown in FIG. 1, a projection display device 1 of the present embodiment is a projection display device of a front projection type comprising a light valve 11 that modulates light based on image data and emits the light an image forming optical system that projects an optical image of the light modulated by the light valve 11 onto the screen (projection surface) 20.

As an image display element used for the light valve 11, any image display element, such as a liquid crystal display element, a digital micromirror device (DMD: registered trademark) display element, or a light emitting diode (LED) display element, may be used. In a case of a system in which an image display element and a light source are provided separately, such as a liquid crystal display element or a DMD display element, the light source need only be appropriately configured corresponding to a system of the image display element. In addition, a system in which pixels themselves emit light, such as an LED display element, that is, a system in which an image display element and a light source are integrally configured may be used.

In a case where the light valve 11 has a multi-plate configuration in which an image display element is provided for each color of RGB, for example, a mirror, a prism, and the like for synthesizing light beams of respective colors may be included in the light valve 11, and in such a case, a portion where the light beams of all colors are synthesized into a single flux of light constituting an image and the synthesized light flux is emitted is regarded as the light valve 11. That is, a reflection member included in the light valve 11 is not regarded as a reflection member of the image forming optical system.

The image forming optical system comprises, in order from the magnification side on the optical path, a first optical system G1 comprising at least one lens, a first reflection member R1 that reflects the light emitted from the light valve 11 toward the first optical system G1, and a second optical system G2 comprising at least one lens.

The first optical system G1 comprises a lens group L1, and an optical axis Z is a straight line without being bent in the first optical system G1.

The second optical system G2 comprises, in order from the magnification side on the optical path, a lens group L2a, a lens group L2b, a second reflection member R2 that reflects the light emitted from the light valve 11, a lens group L2c, and an optical member S assumed to be a filter or the like, and the optical axis Z is bent by 90° in the second optical system G2.

The lens groups in the first optical system G1 and the second optical system G2 are not limited to the configuration consisting of a plurality of lenses, and may have a configuration consisting of only one lens.

As the first reflection member R1 and the second reflection member R2, an optical element having a reflecting surface, such as a mirror or a prism, can be used.

In a case where an axis perpendicular to a plane (parallel to the paper of FIG. 2) including the optical axis Z before being bent and the optical axis Z after being bent in the first reflection member R1 is defined as a rotation axis P, and a direction of rotation around the rotation axis P is defined as a pitch direction, as shown in FIG. 2, the first optical system G1 and the first reflection member R1 are rotatable in the pitch direction around the rotation axis P including a contact point of the optical axis Z on a reflecting surface of the first reflection member R1, and the first reflection member R1 rotates by a pitch angle θ/2 in conjunction with rotation of the first optical system G1 by a pitch angle θ. The rotation axis P in the pitch direction is not limited to the aspect including the contact point of the optical axis Z on the reflecting surface of the first reflection member R1, and may be slightly deviated from the position including the contact point of the optical axis Z on the reflecting surface of the first reflection member R1 within a range where an optical image of the light modulated by the light valve 11 can be normally projected.

In the rotation of the first optical system G1 and the first reflection member R1 in the pitch direction, in a case where a relationship that the first reflection member R1 rotates by a pitch angle θ/2 with respect to the rotation of the first optical system G1 by a pitch angle θ is broken, the optical axis Z of the image forming optical system and the central axis of the lens of the first optical system G1 deviate from each other, and the projection performance deteriorates.

An example of a mechanism that can be easily adjusted while maintaining this relationship will be described. The first optical system G1 is rotatably held on the rotation axis P. In addition, the first reflection member R1 is rotatably held on the rotation axis P independently of the first optical system G1. A gear is attached to the rotating portion of the first optical system G1 and the rotating portion of the first reflection member R1, and two gears attached to the rotating portion of the first optical system G1 and the rotating portion of the first reflection member R1 operate in conjunction with each other via other gears. Further, the diameter and the number of teeth of each gear are adjusted so that the rotation speed of the first reflection member R1 is ½ of the rotation speed of the first optical system G1.

In a case where an optical axis on the light valve 11 side with the first reflection member R1 as a base point is defined as a rotation axis Y (here, in a case where there is a reflection member on the light valve 11 side with the first reflection member R1 as a base point, an optical axis to the first reflection member on the light valve 11 side with the first reflection member R1 as a base point is defined as a rotation axis Y), and a direction of rotation around the rotation axis Y is defined as a yaw direction, the first optical system G1 and the first reflection member R1 which is a reflection member closest to the projection surface side along the optical path are integrally rotatable in the yaw direction around the optical axis on the light valve 11 side with the first reflection member R1 as a base point, the optical axis being the rotation axis Y.

As described above, in a case of an image forming optical system having two reflection members, only the first optical system G1 and the first reflection member R1 which is a reflection member closest to the projection surface side along the optical path are rotatable in the pitch direction and the yaw direction, thereby making it possible to minimize the configuration of the movable part. For this reason, it is advantageous in enhancing the rotation accuracy of the movable part and optically correcting the trapezoidal distortion with high accuracy.

FIGS. 3 to 6 are explanatory views of a projection state of the projection display device 1. In the projection display device 1 of the present embodiment, a rectangular image 21 is projected on the screen 20 as an optical image of the light modulated by the light valve 11.

In this case, in a case where the installation position of the projection display device 1 and/or the projection angle of projection light is not appropriate with respect to the screen 20, the shape of the projected image is deformed, which causes a problem of so-called trapezoidal distortion.

Figure 3:
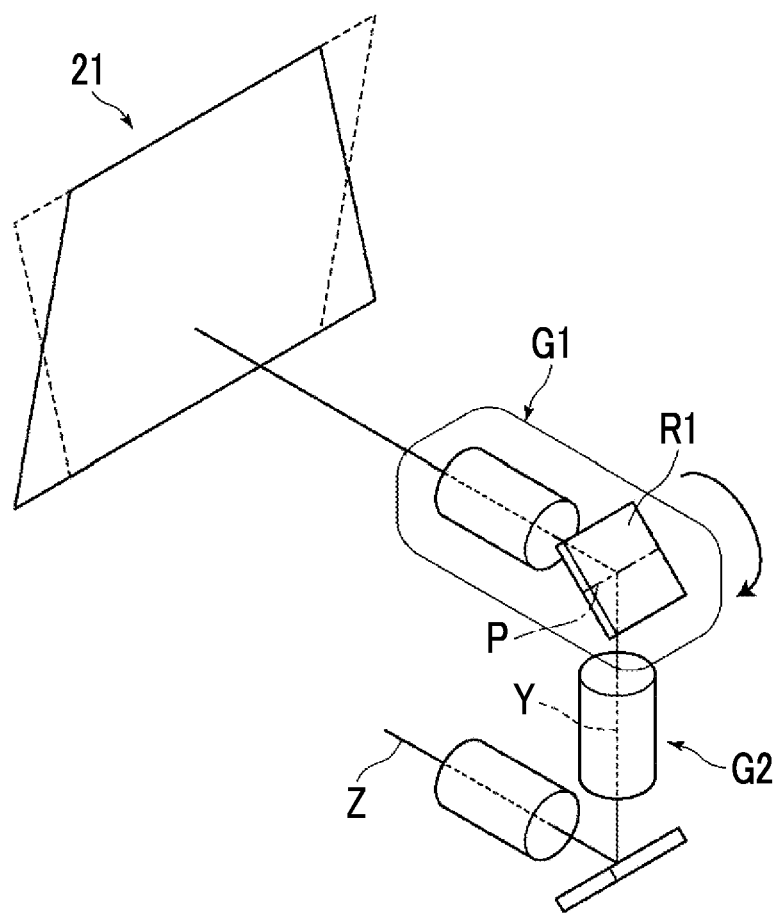
FIG. 3 is an explanatory view of a projection state of the projection display device shown in FIG. 1.

As shown in FIG. 3, in a case where the image 21 projected on the screen 20 is projected in a trapezoidal shape in which the upper side and the lower side are parallel and the right side and the left side are inclined, the trapezoidal distortion can be optically corrected by rotating the first optical system G1 and the first reflection member R1 in the pitch direction around the rotation axis P.

Figure 4:
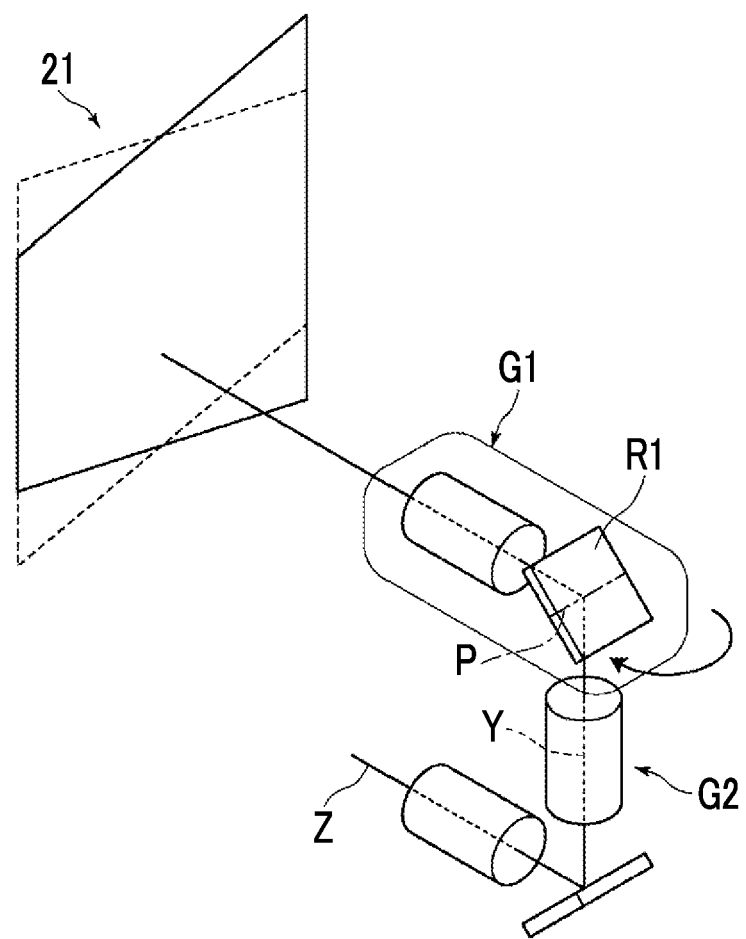
FIG. 4 is an explanatory view of a projection state of the projection display device shown in FIG. 1.

As shown in FIG. 4, in a case where the image 21 projected on the screen 20 is projected in a trapezoidal shape in which the right side and the left side are parallel and the upper side and the lower side are inclined, the trapezoidal distortion can be optically corrected by integrally rotating the first optical system G1 and the first reflection member R1 in the yaw direction around the rotation axis Y.

Figure 5:
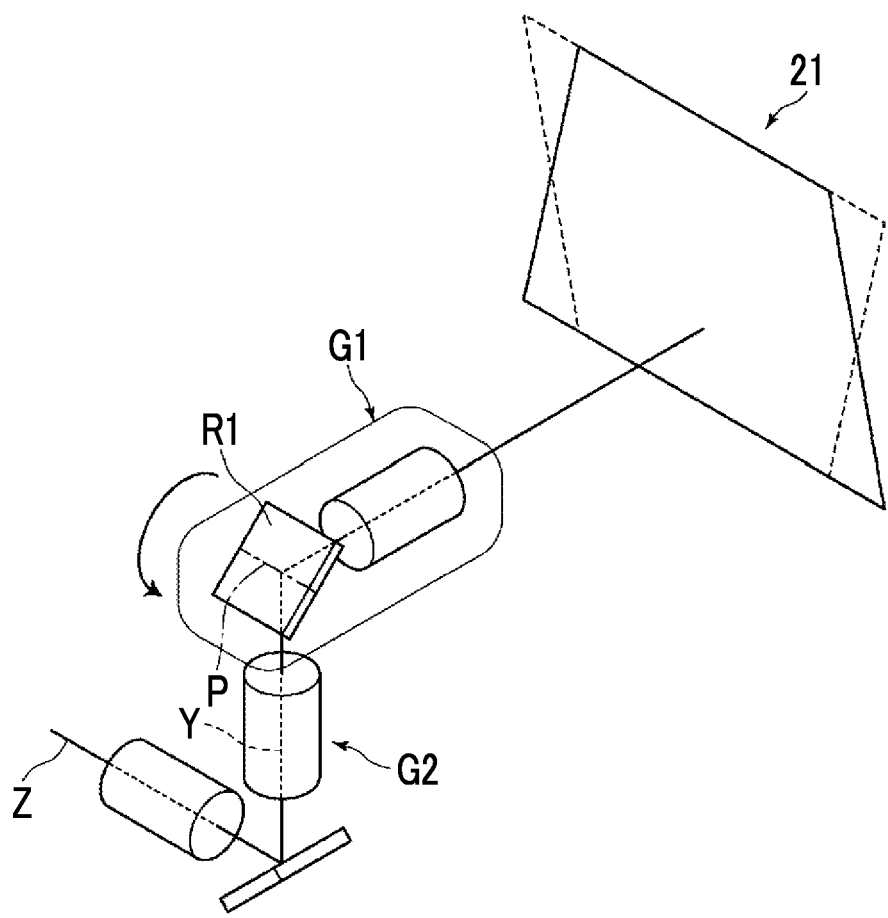
FIG. 5 is an explanatory view of a projection state of the projection display device shown in FIG. 1.

As shown in FIG. 5, in a case where the projection is performed while the optical axis Z from the first reflection member R1 to the first optical system G1 is inclined by 90° with respect to the optical axis Z from the light valve 11 to the second reflection member R2, the trapezoidal distortion can be optically corrected by rotating the first optical system G1 and the first reflection member R1 in the pitch direction around the rotation axis P in the same manner as described in FIG. 3, even in a case where the image 21 projected on the screen 20 is projected in a trapezoidal shape in which the upper side and the lower side are parallel and the right side and the left side are inclined.

Figure 6:
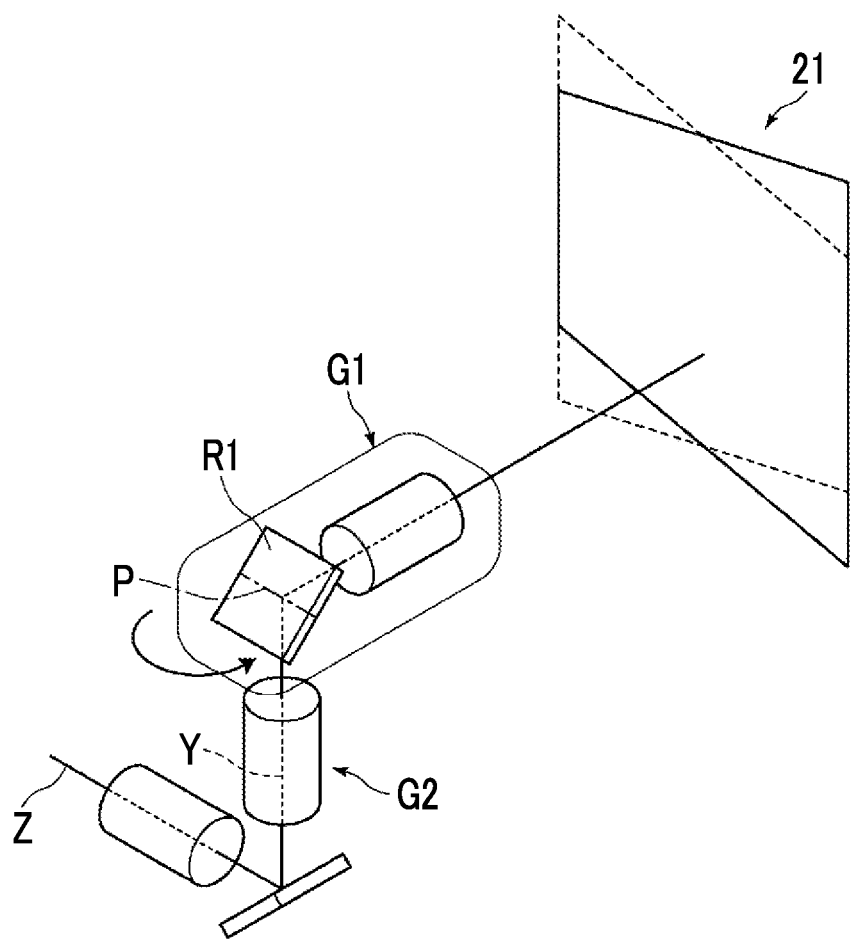
FIG. 6 is an explanatory view of a projection state of the projection display device shown in FIG. 1.

As shown in FIG. 6, in a case where the projection is performed while the optical axis Z from the first reflection member R1 to the first optical system G1 is inclined by 90° with respect to the optical axis Z from the light valve 11 to the second reflection member R2, the trapezoidal distortion can be optically corrected by integrally rotating the first optical system G1 and the first reflection member R1 in the yaw direction around the rotation axis Y in the same manner as described in FIG. 4, even in a case where the image 21 projected on the screen 20 is projected in a trapezoidal shape in which the right side and the left side are parallel and the upper side and the lower side are inclined.

Here, the rotation of the first optical system G1 and the first reflection member R1 in the pitch direction and/or the yaw direction may be manually performed by a user. In addition, a driving unit 12 having a function as a first driving unit that rotatably drives the first optical system G1 and the first reflection member R1 in the pitch direction and a function as a second driving unit that rotatably drives the first optical system G1 and the first reflection member R1 in the yaw direction may be provided to perform electric rotation. As the driving unit 12, various known mechanisms such as a motor can be used.

In a case where the driving unit 12 is provided to electrically rotate the first optical system G1 and the first reflection member R1 in the pitch direction and/or the yaw direction, an input unit such as a cross key may be provided to allow the rotation based on a user's instruction input.

A control unit 13 having a function as a first control unit that controls, based on the shape of the image 21 projected on the screen 20, the amount of rotation driving of the first optical system G1 and the first reflection member R1 in the pitch direction by the driving unit 12 and a function as a second control unit that controls, based on the shape of the image 21 projected on the screen 20, the amount of rotation driving of the first optical system G1 and the first reflection member R1 in the yaw direction by the driving unit 12 may be provided to perform automatic rotation.

The hardware configuration of the control unit 13 is not particularly limited, and can be realized by appropriately combining an integrated circuit (IC), a processor, an application specific integrated circuit (ASIC), and a field-programmable gate array (FPGA), and a memory.

Further, a program for realizing all or a part of the functions of the control unit 13 may be recorded in a computer-readable recording medium, and the program recorded in the recording medium may be read into the computer system for execution, thereby realizing the functions. The phrase "computer system" referred to herein includes an OS and hardware such as peripheral devices.

Further, the phrase "computer system" includes a homepage providing environment (or a display environment) in a case where a WWW system is used.

The phrase "computer-readable recording medium" refers to a portable medium such as a flexible disk, a magneto-optical disk, a ROM, or a CD-ROM, and a storage device such as a hard disk built in a computer system.

Further, the phrase "computer-readable recording medium" also includes a form that dynamically holds a program for a short period of time, such as communication wires in a case of transmitting the program via a network such as the Internet or a communication line such as a telephone line, and a form that holds the program for a certain period of time, such as a volatile memory provided inside the computer system to be a server or a client in such a case.

In addition, the program may be for realizing a part of the functions described above or may be realized by combining the functions described above with a program already recorded in the computer system.

In a case where the trapezoidal distortion is automatically corrected, a camera 14 that captures an image in the vicinity of the screen 20 is provided to capture the image 21 projected on the screen 20, the shape of the image 21 is measured using a known image recognition technique, and the amount of rotation driving of the first optical system G1 and the first reflection member R1 in the pitch direction and/or the yaw direction by the driving unit 12 need only be controlled based on the shape.

In the projection display device 1 of the present embodiment, the image forming optical system is preferably a relay optical system that forms an intermediate image M. Such a configuration is advantageous in widening the angle of the image forming optical system. In addition, by using the image forming optical system as a relay optical system, a reflection member can be easily inserted into the image forming optical system, and a light beam on the projection display device 1 side among the projection light beams emitted from the projection display device 1 can approach a horizontal state to a housing of the projection display device 1. For this reason, it is possible to improve the installability of the projection display device 1.

In addition, the wider the total angle of view, the closer the projection display device 1 can approach the screen 20 while maintaining the projection size of an image. For this reason, it is possible to improve the installability of the projection display device 1, and thus, the total angle of view of the image forming optical system is preferably 90 or more.

Here, there is a problem that the wider the total angle of view, the more remarkable the trapezoidal distortion that occurs in a case where the installation position of the projection display device 1 and/or the projection angle of the projection light is not appropriate with respect to the screen 20. However, in the projection display device 1 of the present embodiment, the trapezoidal distortion can be optically corrected by rotating the first optical system G1 and the first reflection member R1 in the pitch direction and/or the yaw direction. For this reason, even in a case where the total angle of view is set at a wide angle of 90° or more, an image with good image quality can be projected.

Figure 7:
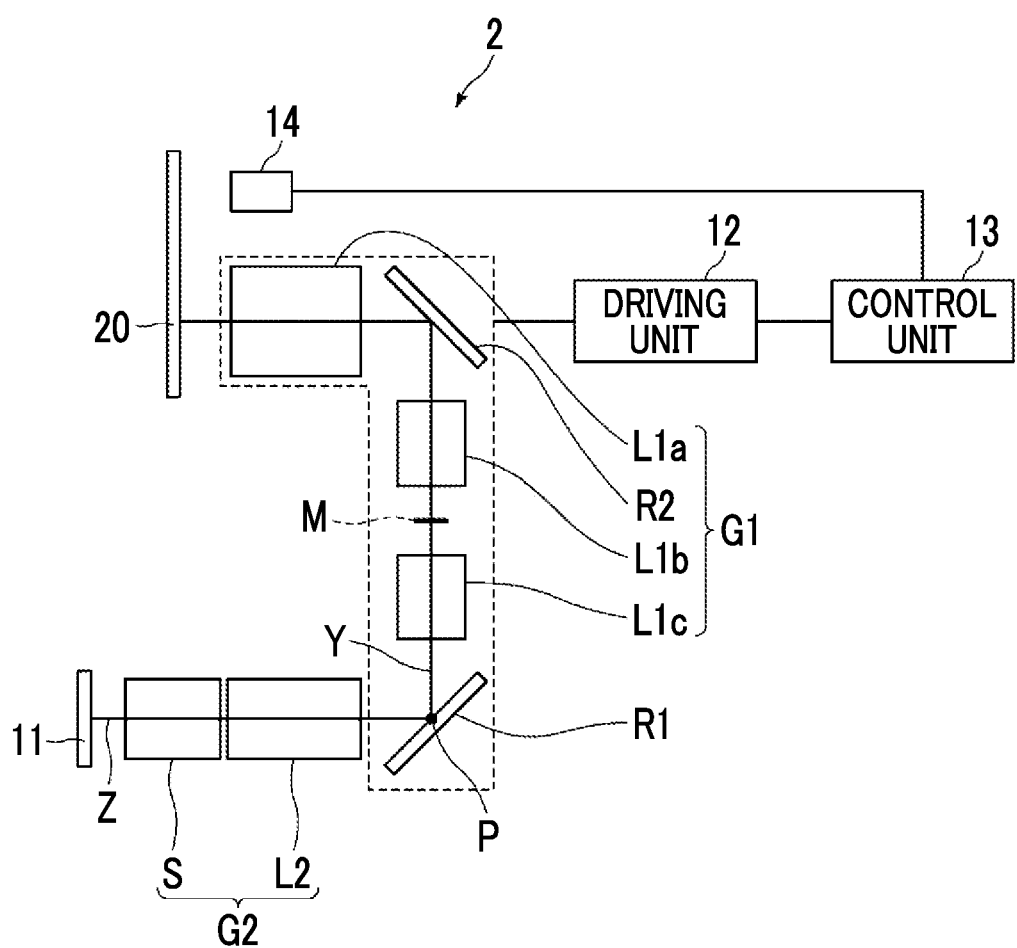
FIG. 7 is a schematic configuration diagram of a projection display device according to a second embodiment of the present invention.

Next, a second embodiment of the projection display device of the present invention will be described in detail with reference to the drawings. FIG. 7 is a schematic configuration diagram of a projection display device according to the second embodiment of the present invention. In the present embodiment, elements equivalent to the elements in FIG. 1 are represented by the same reference numerals and description thereof will not be repeated unless needed. Here, only a difference will be mainly described.

A projection display device 2 of the present embodiment has a different configuration of the image forming optical system from that of the projection display device 1 of the first embodiment.

As shown in FIG. 7, the image forming optical system of the projection display device 2 of the present embodiment comprises, in order from the magnification side on the optical path, a first optical system G1 comprising at least one lens, a first reflection member R1 that reflects the light emitted from the light valve 11 toward the first optical system G1, and a second optical system G2 comprising at least one lens.

The first optical system G1 comprises, in order from the magnification side on the optical path, a lens group L1*a*, a second reflection member R2 that reflects the light emitted from the light valve 11, a lens group L1*b*, and a lens group L1*c*, and the optical axis Z is bent by 900 in the first optical system G1.

The second optical system G2 comprises, in order from the magnification side on the optical path, a lens group L2 and an optical member S assumed to be a filter or the like, and the optical axis Z is a straight line without being bent in the second optical system G2.

The first optical system G1 and the first reflection member R1 is rotatable in the pitch direction around the rotation axis P in a horizontal direction (direction perpendicular to the paper of FIG. 7) including a contact point of the optical axis Z on the reflecting surface of the first reflection member R, and the first reflection member R1 rotates by a pitch angle θ/2 in conjunction with rotation of the first optical system G1 by a pitch angle θ.

In addition, the first optical system G1 including the second reflection member R2 which is a reflection member closest to the projection surface side along the optical path is integrally rotatable in the yaw direction around the optical axis on the light valve 11 side with the second reflection member R2 as a base point, the optical axis being the rotation axis Y In the image forming optical system of the projection display device 2 of the present embodiment, only the second reflection member R2 which is a reflection member closest to the projection surface side along the optical path and at least a portion of the first optical system G1 on the magnification side from the second reflection member R2 may be integrally rotatable in the yaw direction around the rotation axis Y.

Figure 8:
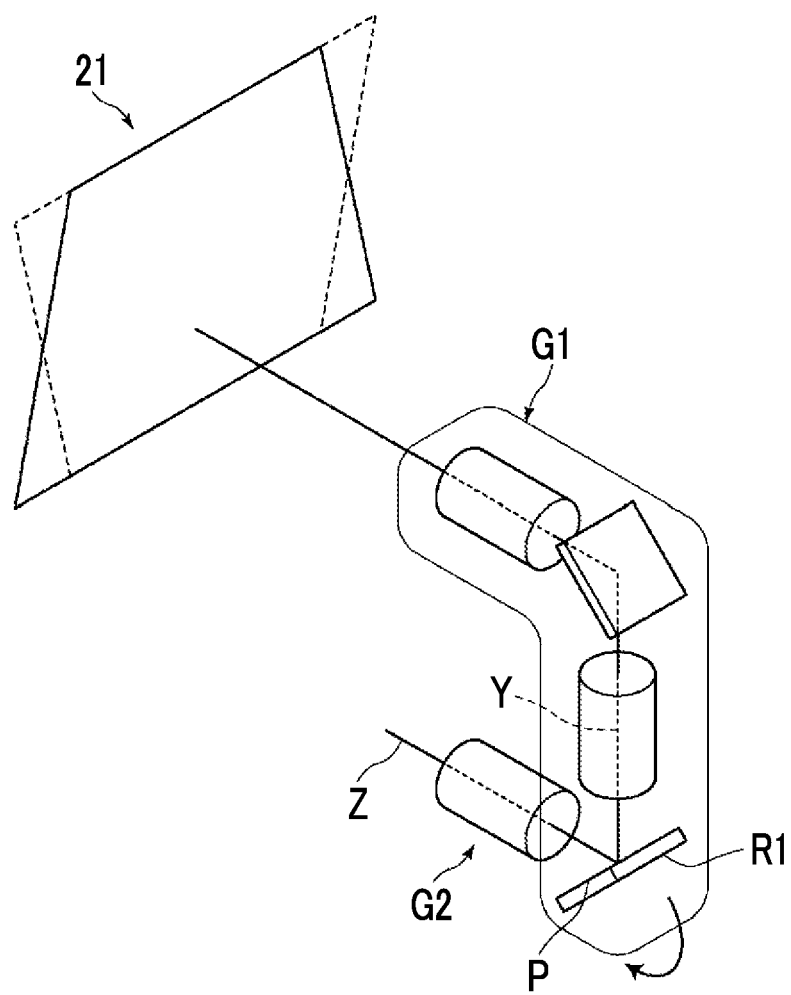
FIG. 8 is an explanatory view of a projection state of the projection display device shown in FIG. 7.
Figure 9:
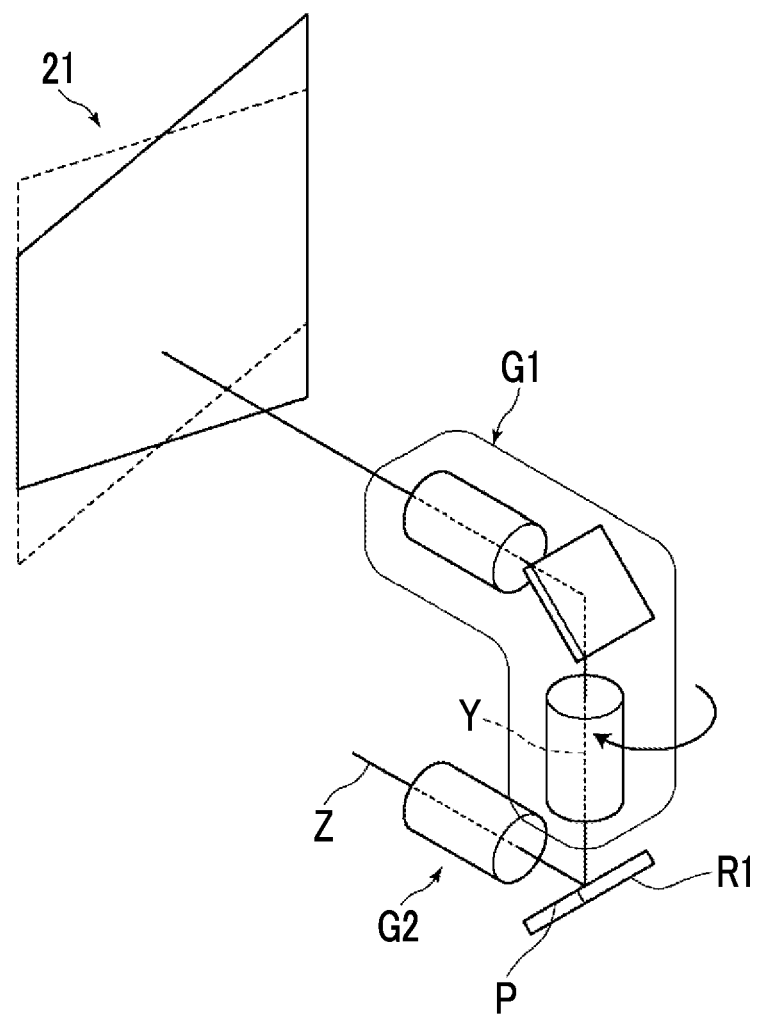
FIG. 9 is an explanatory view of a projection state of the projection display device shown in FIG. 7.
Figure 10:
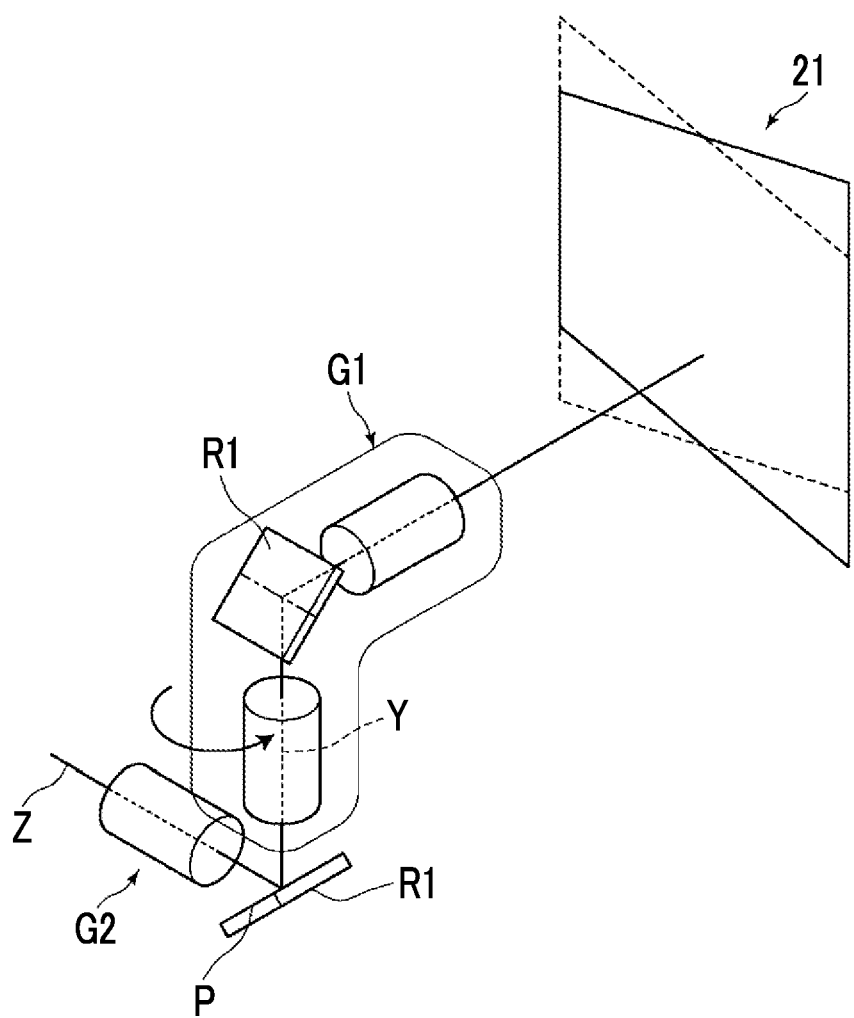
FIG. 10 is an explanatory view of a projection state of the projection display device shown in FIG. 7.

FIGS. 8 to 10 are explanatory views of a projection state of the projection display device 2. In the projection display device 2 of the present embodiment, a rectangular image 21 is projected on the screen 20 as an optical image of the light modulated by the light valve 11.

In this case, in a case where the installation position of the projection display device 2 and/or the projection angle of projection light is not appropriate with respect to the screen 20, the shape of the projected image is deformed, which causes a problem of so-called trapezoidal distortion.

As shown in FIG. 8, in a case where the image 21 projected on the screen 20 is projected in a trapezoidal shape in which the upper side and the lower side are parallel and the right side and the left side are inclined, the trapezoidal distortion can be optically corrected by rotating the first optical system G1 and the first reflection member R1 in the pitch direction around the rotation axis P.

As shown in FIG. 9, in a case where the image 21 projected on the screen 20 is projected in a trapezoidal shape in which the right side and the left side are parallel and the upper side and the lower side are inclined, the trapezoidal distortion can be optically corrected by rotating the first optical system G1 including the second reflection member R2 which is a reflection member closest to the projection surface side along the optical path in the yaw direction around the rotation axis Y.

As shown in FIG. 10, in a case where the projection is performed while the optical axis Z from the first reflection member R1 to the first optical system G1 is inclined by 90° with respect to the optical axis Z from the light valve 11 to the second reflection member R2, the trapezoidal distortion can be optically corrected by rotating the first optical system G1 including the second reflection member R2 which is a reflection member closest to the projection surface side along the optical path in the yaw direction around the rotation axis Y in the same manner as described in FIG. 9, even in a case where the image 21 projected on the screen 20 is projected in a trapezoidal shape in which the right side and the left side are parallel and the upper side and the lower side are inclined.

Even in the projection display device 2 of the present embodiment, it is possible to obtain the same effects as the projection display device 1 of the first embodiment.

Figure 11:
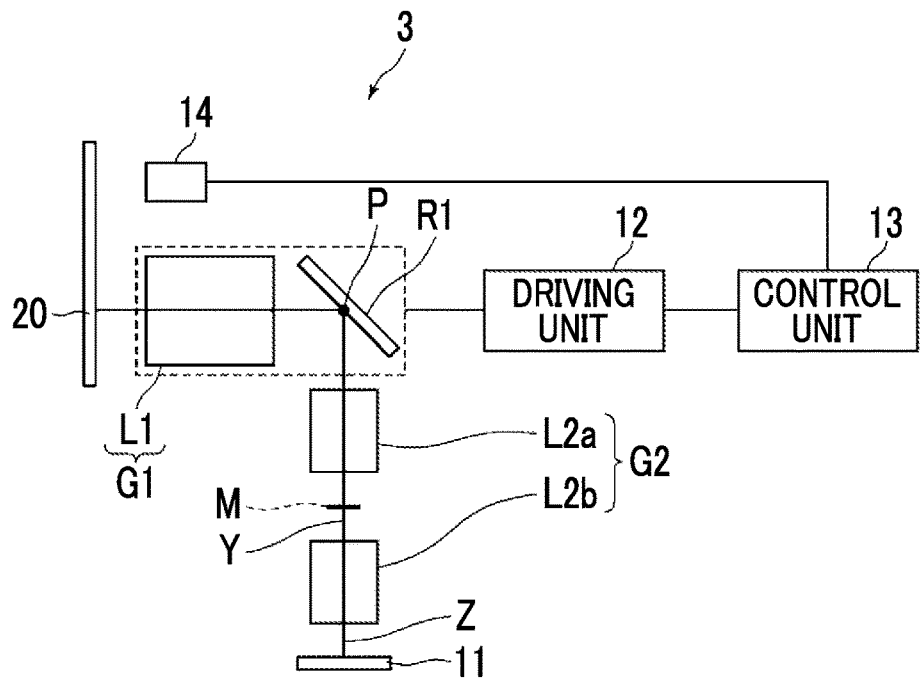
FIG. 11 is a schematic configuration diagram of a projection display device according to a third embodiment of the present invention.

Next, a third embodiment of the projection display device of the present invention will be described in detail with reference to the drawings. FIG. 11 is a schematic configuration diagram of a projection display device according to the third embodiment of the present invention. In the present embodiment, elements equivalent to the elements in FIG. 1 are represented by the same reference numerals and description thereof will not be repeated unless needed. Here, only a difference will be mainly described.

A projection display device 3 of the present embodiment has a different configuration of the image forming optical system from that of the projection display device 1 of the first embodiment.

As shown in FIG. 11, the image forming optical system of the projection display device 3 of the present embodiment comprises, in order from the magnification side on the optical path, a first optical system G1 comprising at least one lens, a first reflection member R1 that reflects the light emitted from the light valve 11 toward the first optical system G1, and a second optical system G2 comprising at least one lens.

The first optical system G1 comprises a lens group L1, and an optical axis Z is a straight line without being bent in the first optical system G1.

The second optical system G2 comprises, in order from the magnification side on the optical path, a lens group L2$a$ and a lens group L2$b$, and the optical axis Z is a straight line without being bent in the second optical system G2.

The first optical system G1 and the first reflection member R1 is rotatable in the pitch direction around the rotation axis P in a horizontal direction (direction perpendicular to the paper of FIG. 11) including a contact point of the optical axis Z on the reflecting surface of the first reflection member R, and the first reflection member R1 rotates by a pitch angle θ/2 in conjunction with rotation of the first optical system G1 by a pitch angle θ.

In addition, the first optical system G1 and the first reflection member R1 which is a reflection member closest to the projection surface side along the optical path are integrally rotatable in the yaw direction around the optical axis on the light valve 11 side with the first reflection member R1 as a base point, the optical axis being the rotation axis Y.

Figure 12:
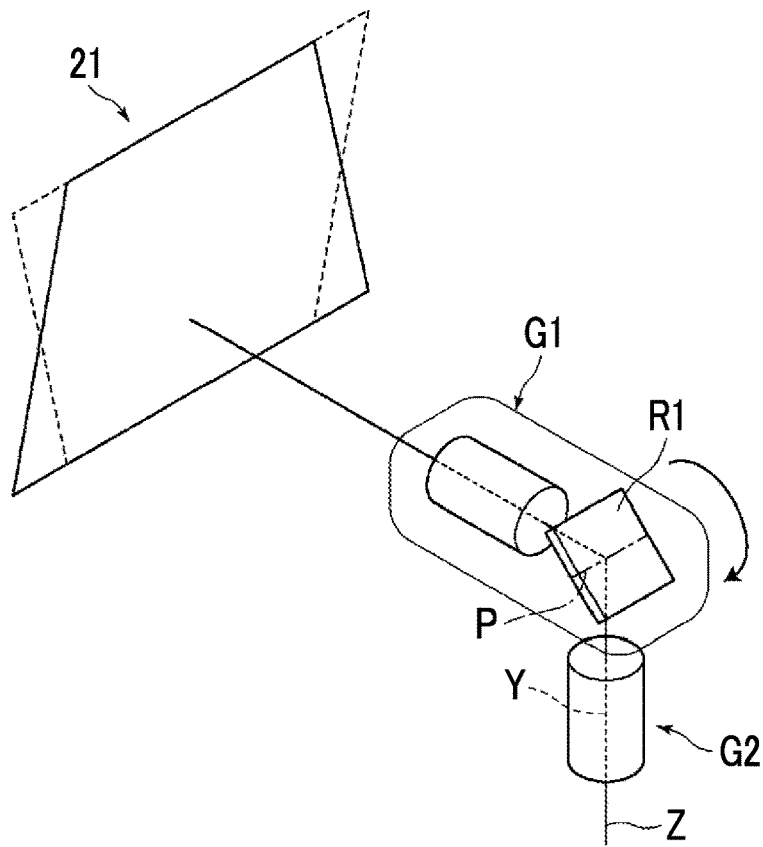
FIG. 12 is an explanatory view of a projection state of the projection display device shown in FIG. 11.
Figure 13:
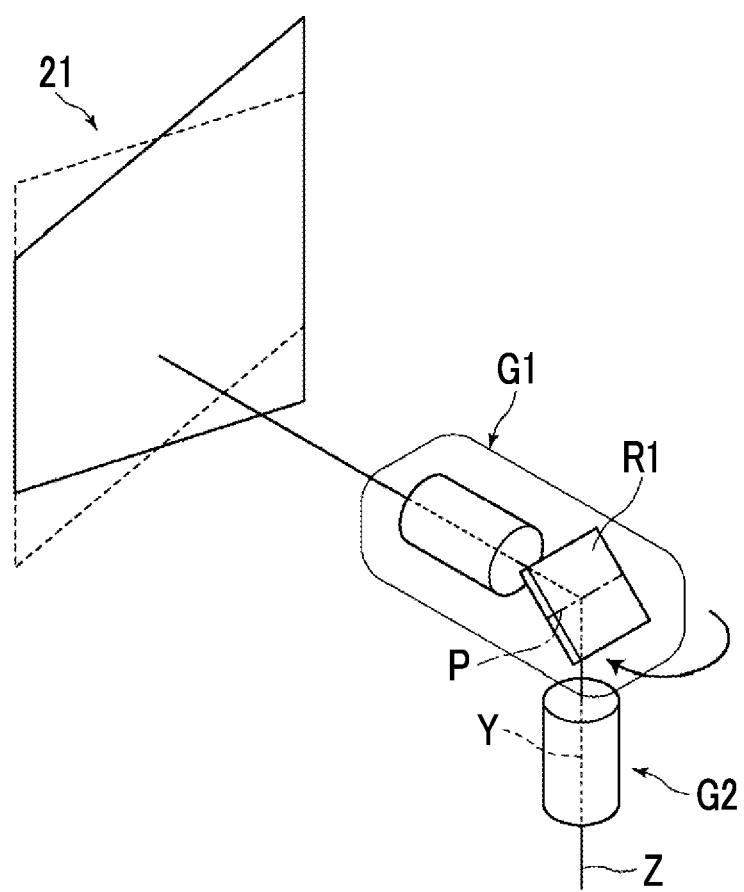
FIG. 13 is an explanatory view of a projection state of the projection display device shown in FIG. 11.
Figure 14:
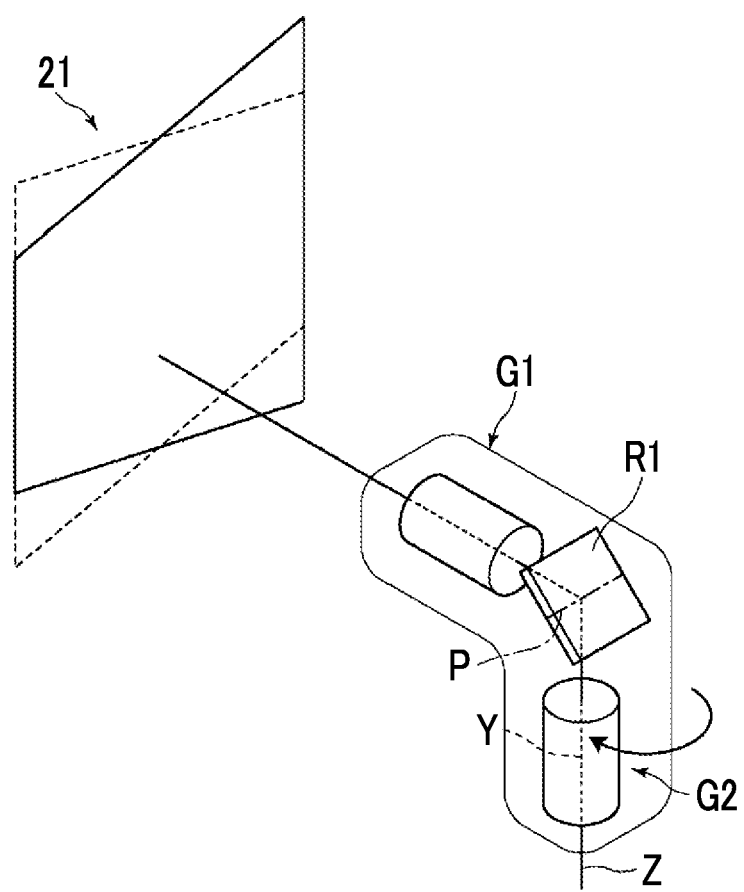
FIG. 14 is an explanatory view of a projection state of the projection display device shown in FIG. 11.

FIGS. 12 to 14 are explanatory views of a projection state of the projection display device 3. In the projection display device 3 of the present embodiment, a rectangular image 21 is projected on the screen 20 as an optical image of the light modulated by the light valve 11.

In this case, in a case where the installation position of the projection display device 3 and/or the projection angle of projection light is not appropriate with respect to the screen 20, the shape of the projected image is deformed, which causes a problem of so-called trapezoidal distortion.

As shown in FIG. 12, in a case where the image 21 projected on the screen 20 is projected in a trapezoidal shape in which the upper side and the lower side are parallel and the right side and the left side are inclined, the trapezoidal distortion can be optically corrected by rotating the first optical system G1 and the first reflection member R1 in the pitch direction around the rotation axis P.

As shown in FIG. 13, in a case where the image 21 projected on the screen 20 is projected in a trapezoidal shape in which the right side and the left side are parallel and the upper side and the lower side are inclined, the trapezoidal distortion can be optically corrected by integrally rotating the first optical system G1 and the first reflection member R1 in the yaw direction around the rotation axis Y.

In this case, as shown in FIG. 14, the trapezoidal distortion can also be optically corrected by integrally rotating the first optical system G1, the first reflection member R1, and the second optical system G2 in the yaw direction around the rotation axis Y.

Even in the projection display device 3 of the present embodiment, it is possible to obtain the same effects as the projection display device 1 of the first embodiment.

Although embodiments of the projection display device of the present invention have been described above, the present invention is not limited to the embodiments.

For example, regarding the image forming optical system, although the aspect in which the first optical system is rotatable in two directions of the pitch direction and the yaw direction has been described in the above embodiments, an aspect in which the first optical system rotates only in the pitch direction and not in the yaw direction may be used, or an aspect in which the first optical system rotates only in the yaw direction and not in the pitch direction may be used.

In addition to those described above, various improvements or modifications may be of course made without departing from the spirit and scope of the present invention.

The disclosure of Japanese application Japanese Patent Application No. 2018-163999 filed on Aug. 31, 2018 is incorporated herein by reference in its entirety. All documents, patent applications, and technical standards described in the present specification are herein incorporated by reference to the same extent that each individual document, patent application, or technical standard was specifically and individually indicated to be incorporated by reference.

What is claimed is:

1. A projection display device of a front projection type comprising:
a light valve that modulates light based on image data and emits the light; and
an image forming optical system that projects an optical image of the light modulated by the light valve onto a projection surface,
the projection display device comprising:
a first optical system including at least one lens, as the image forming optical system;
a first reflection member that reflects the light emitted from the light valve toward the first optical system, as the image forming optical system; a first gear attached to the first optical system;
a second gear attached to the first reflection member; and
a third gear,
wherein the first optical system and the first reflection member are configured to be rotatable in a pitch direction,
the first gear and the second gear are interlocked with each other through the third gear, and
the first reflection member rotates by a pitch angle $\theta/2$ in conjunction with rotation of the first optical system by a pitch angle $\theta$, by adjusted a diameter and a number of teeth of the first gear, the second gear, and the third gear.

2. The projection display device according to claim 1, wherein the image forming optical system includes a second reflection member that reflects the light emitted from the light valve.

3. The projection display device according to claim 1, wherein the image forming optical system is a relay optical system that forms an intermediate image.

4. The projection display device according to claim 2, wherein the image forming optical system is a relay optical system that forms an intermediate image.

5. The projection display device according to claim 1, wherein a total angle of view of the image forming optical system is 90° or more.

6. The projection display device according to claim 2, wherein a total angle of view of the image forming optical system is 90° or more.

7. The projection display device according to claim 3, wherein a total angle of view of the image forming optical system is 90° or more.

8. The projection display device according to claim 4, wherein a total angle of view of the image forming optical system is 90° or more.

9. The projection display device according to claim 1, further comprising:
a first driving unit that rotatably drives the first optical system and the first reflection member in the pitch direction.

10. The projection display device according to claim 2, further comprising:
a first driving unit that rotatably drives the first optical system and the first reflection member in the pitch direction.

11. The projection display device according to claim 3, further comprising:
a first driving unit that rotatably drives the first optical system and the first reflection member in the pitch direction.

12. The projection display device according to claim 4, further comprising:
a first driving unit that rotatably drives the first optical system and the first reflection member in the pitch direction.

13. The projection display device according to claim 9, further comprising:
a first control unit that controls an amount of rotation driving of the first optical system and the first reflection member in the pitch direction by the first driving unit based on a shape of the optical image projected on the projection surface.

14. The projection display device according to claim 1, wherein the reflection member closest to the projection surface side along an optical path and at least a portion of the first optical system on a magnification side from the reflection member closest to the projection surface side are configured to be integrally rotatable in a yaw direction around an optical axis on the light valve side with the reflection member closest to the projection surface side as a base point.

15. The projection display device according to claim 14, further comprising:
a second driving unit that rotatably drives the reflection member closest to the projection surface side along the optical path and at least the portion of the first optical system on the magnification side from the reflection member closest to the projection surface side in the yaw direction.

16. The projection display device according to claim 15, further comprising:
a second control unit that controls, based on a shape of the optical image projected on the projection surface, an amount of rotation driving of the reflection member closest to the projection surface side along the optical path and at least the portion of the first optical system on the magnification side from the reflection member closest to the projection surface side in the yaw direction by the second driving unit.

17. A projection display device of a front projection type comprising:
a light valve that modulates light based on image data and emits the light; and
an image forming optical system that projects an optical image of the light modulated by the light valve onto a projection surface,
wherein the image forming optical system includes a first optical system that includes at least one lens and at least one reflection member that reflects the light emitted from the light valve,
the reflection member closest to the projection surface side along an optical path and at least a portion of the first optical system on a magnification side from the reflection member closest to the projection surface side are configured to be integrally rotatable in a yaw direction around an optical axis on the light valve side with the reflection member closest to the projection surface side as a base point, and
the projection display device includes a second driving unit that rotatably drives the reflection member closest to the projection surface side along the optical path and at least the portion of the first optical system on the magnification side from the reflection member closest to the projection surface side in the yaw direction.

18. The projection display device according to claim 17, further comprising:
a second control unit that controls, based on a shape of the optical image projected on the projection surface, an amount of rotation driving of the reflection member closest to the projection surface side along the optical path and at least the portion of the first optical system on the magnification side from the reflection member closest to the projection surface side in the yaw direction by the second driving unit.

19. The projection display device according to claim 17, wherein the image forming optical system is a relay optical system that forms an intermediate image.

20. The projection display device according to claim 17, wherein a total angle of view of the image forming optical system is 90° or more.

* * * * *